US009544679B2

(12) United States Patent
Trestain et al.

(10) Patent No.: US 9,544,679 B2
(45) Date of Patent: Jan. 10, 2017

(54) ADJUSTING SPEAKERS USING FACIAL RECOGNITION (71) Applicant: HARMAN INTERNATIONAL INDUSTRIES, INC., Stamford, CT (US)

(72) Inventors: Christopher Michael Trestain, Redford, MI (US); Bradford James Hamme, Farmington, MI (US)

(73) Assignee: HARMAN INTERNATIONAL INDUSTRIES, INC., Stamford, CT (US)

( * ) Notice: Subject to any disclaimer, the term of this patent is extended or adjusted under 35 U.S.C. 154(b) by 0 days.

(21) Appl. No.: 14/563,599

(22) Filed: Dec. 8, 2014

(65) Prior Publication Data
US 2016/0165337 A1 Jun. 9, 2016

(51) Int. Cl.
*G06F 17/00* (2006.01)
*H04R 1/32* (2006.01)
*G06K 9/00* (2006.01)
*H04S 7/00* (2006.01)

(52) U.S. Cl.
CPC ......... *H04R 1/323* (2013.01); *G06K 9/00221* (2013.01); *H04S 7/303* (2013.01); *H04R 2201/025* (2013.01)

(58) Field of Classification Search
CPC ............ H04S 7/303; H04S 7/302; H04S 7/30; H04R 1/323; H04R 2205/024; G06F 3/012
See application file for complete search history.

(56) References Cited

U.S. PATENT DOCUMENTS

| 2005/0105744 | A1 | 5/2005 | Lee | |
|---|---|---|---|---|
| 2006/0140420 | A1* | 6/2006 | Machida | H04H 60/04 381/116 |
| 2007/0183618 | A1 | 8/2007 | Ishii et al. | |
| 2010/0027832 | A1* | 2/2010 | Koseki | H04R 1/323 381/387 |
| 2010/0226499 | A1* | 9/2010 | De Bruijn | H04R 1/403 381/17 |

(Continued)

FOREIGN PATENT DOCUMENTS

WO   0241664 A2   5/2002

OTHER PUBLICATIONS

U.S. Appl. No. 14/505,094, entitled Mount for Media Content Presentation Device, filed Oct. 2, 2014.

(Continued)

*Primary Examiner* — Joseph Saunders, Jr.
(74) *Attorney, Agent, or Firm* — Artegis Law Group, LLP (57) ABSTRACT

Embodiments herein describe an audio system that adjusts based on the location of a person. That is, instead of relying on fixed speakers, the audio system adjusts the direction of audio output for one or more speakers to optimize the performance of the audio system based on the location of a user or based on the number of users. To do so, the audio system may include a camera and a tracking application which identifies the location of a user and/or the number of users in front of the camera. Using this information, the audio system adjusts one or more actuators coupled to a speaker to change the direction of the audio output of the speaker. As the user continues to move or shift, the audio system can continually adjust the speaker to optimize the performance of the system.

20 Claims, 8 Drawing Sheets (56) References Cited

U.S. PATENT DOCUMENTS

2010/0272271 A1* 10/2010 Hayakawa ............... H04R 3/12
 381/59
2012/0281128 A1   11/2012 Shintani
2013/0077803 A1*  3/2013 Konno .................. H04R 1/323
 381/107
2015/0078595 A1*  3/2015 Shintani ................ H04S 7/303
 381/303

OTHER PUBLICATIONS

Extended European Search Report Application No. 15197018.3, dated May 31, 2016, 9 pages.

* cited by examiner

ADJUSTING SPEAKERS USING FACIAL RECOGNITION

BACKGROUND

The present disclosure is related to steerable speakers, and more specifically, to using facial recognition to adjust a direction of the steerable speakers.

Fixed speakers are commonly used to output audio in a vehicle. For example, motor vehicles such as cars typically have multiple speakers in a fixed arrangement to output audio (e.g., music, book on tape, radio shows, etc) for a driver and passengers in the vehicle. However, fixed speakers cannot adjust in response to the passengers being at different locations in the listening environment. One particular speaker arrangement may be optimal for a passenger with a certain height but not optimal for passengers that are taller or shorter. Furthermore, the direction of the audio output in a fixed speaker arrangement does not change depending on the number of passengers in the vehicle. For example, if the speaker arrangement is designed to provide optimal performance when four passengers are in the vehicle, when less than four passengers are in the vehicle, the performance of the arrangement may be less optimal than other arrangements of the speakers.

SUMMARY

According to one embodiment of the present disclosure, a method includes receiving a location of a user based on image data captured by a camera and identifying one or more coordinates in space based on the location of the user. The method also includes generating a control signal for adjusting at least one actuator based on the one or more coordinates, the control signal is configured to change an orientation of a speaker such that an audio output region of the speaker includes the one or more coordinates.

Another embodiment of the present disclosure is a system that includes a steerable speaker, an actuator mechanically coupled to the steerable speaker, and a computing device. The computing device is configured to receive a location of a user based on image data captured by the camera and identify one or more coordinates in space based on the location of the user. The computing device also is configured to generate a control signal for adjusting the actuator based on the one or more coordinates, the control signal is configured to change an orientation of the steerable speaker such that an audio output region of the steerable speaker includes the one or more coordinates.

Another embodiment of the present disclosure is a computer program product for adjusting a speaker where the computer program product includes computer-readable program code executable by one or more computer processors. The program code is configured to receive a location of a user based on image data captured by a camera and identify one or more coordinates in space based on the location of the user. Furthermore, the program code is configured to generate a control signal for adjusting at least one actuator based on the one or more coordinates, the control signal is configured to change an orientation of the speaker such that an audio output region of the speaker includes the one or more coordinates.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION OF THE PREFERRED EMBODIMENTS

Embodiments herein describe an audio system that adjusts based on the location of a user. Instead of relying on fixed speakers that cannot change the direction of their audio output, audio systems described herein adjust the direction of audio output for one or more speakers depending on the location or the number of users. To do so, the audio system may include a camera and a facial recognition application that identifies the location of a user and/or the number of users in front of the camera. Using this information, the audio system adjusts one or more actuators coupled to a speaker to change the direction of the audio output of the speaker—i.e., the direction the speaker faces. For example, the facial recognition application may identify a location of the user in 3D space, and in response, the audio system adjusts the speaker such that it faces the location. As the user continues to move or shift, the audio system can continually adjust the speaker to optimize the performance of the system.

In one aspect, the facial recognition application detects a plurality of users in front of the camera. The audio system may adjust a speaker based on the various locations of the users. For example, optimal performance may be achieved if the speaker is moved such that the direction of the audio output is between two users. Alternatively, the audio system may include multiple adjustable speakers and adjust one speaker to face one of the users and another speaker to face another speaker. Regardless of the number or the location of the users, the audio system may be preprogrammed to change the direction of the speakers in order to optimize (i.e., improve) audio performance.

Figure 1:
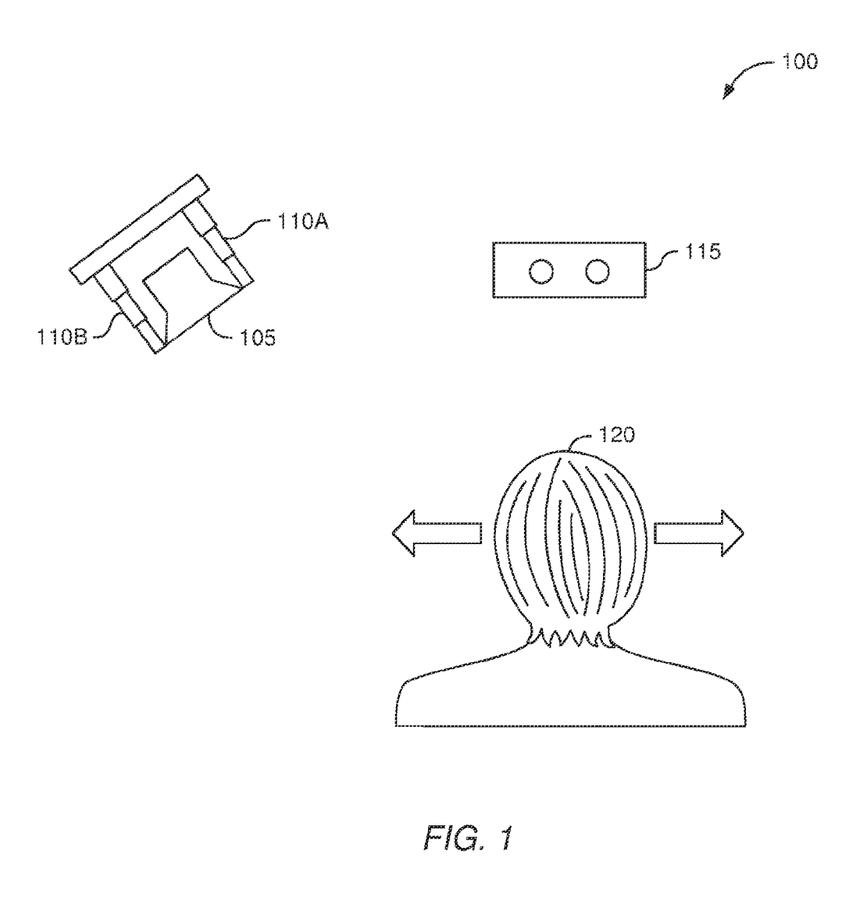
FIG. 1 is a system for adjusting a steerable speaker based on a location of a user.

FIG. 1 is an audio system 100 for adjusting a steerable speaker 105 based on a location of a user. The system 100 includes speaker 105, actuators 110, camera 115, and user 120. As shown, speaker 105 may be any device that produces sound in response to an electrical signal input. Speaker 105 is coupled to actuators 110 which change the direction of the audio output of the speaker 105 along one or more axes of motion—e.g., up and down, left and right, diagonally, circular motion, etc. The actuators 110 shown here are piston actuators the can retract or extend to adjust the direction the speaker 105 is facing. By controlling the two actuators 110A and 110B, the system 100 moves the speaker 105 to face a particular point or area. For example, the area in front of the speaker 105 can be divided into a 2D or 3D grid where, by adjusting the actuators 110, the system 100 moves the speaker 105 to face a point or region within the 2D/3D grid. Furthermore, in one example, the orientation of the camera 115 remains fixed while the orientation of the speaker 105 changes to face the point or region.

The piston actuators 110 shown here are only one example of suitable actuators. The actuators 110 may use a ball and socket, screw, gear system, chains, and the like to adjust the direction of the speaker 105. Additionally, the actuators 110 may use any type of drive system for generating motion such as mechanical, electrical, hydraulic, or pneumatic systems. Although FIG. 1 illustrates two actuators 110, in other examples, the speaker 105 may be moved by only one actuator 110. In one aspect, the actuators 110 may not be directly attached to the speaker 105. For example, cables may be used to transfer a force generated by remote actuators 110 to the speaker 105. Doing so may reduce the form factor of the speaker 105 and permit the speaker 105 to fit in space-limited areas such as in the dashboard or in a pillar separating the windshield and a door of a vehicle.

The camera 115 may include one or more sensors for capturing images based on received electromagnetic signals (e.g., infrared or visible light signals). For example, the camera 115 may include a visual light sensor for detecting electromagnetic signals at approximately 390 to 700 nm (i.e., visible light), a ranging system that uses an infrared projector and sensor to capture images of 3D space, or a combination of both. The information captured by the camera 115 may be either 2D or 3D information. In one aspect, the depth (i.e., the distance between the user 120 and the camera 115) may be known. For example, the audio system may be designed for a room where the user 120 sits on a couch that is a predefined distance from the camera 115 and speaker 105. Thus, using only 2D information, the audio system 110 adjusts the speaker 105 based on the location of the user 120 on the couch. Alternatively, the depth may not be known, and thus, the camera 110 captures 3D information for determining the distance between the user 120 and the camera 115.

Using the information captured by camera 115, the audio system 100 tracks the motion of the user 120 in 1D, 2D, or 3D space. Based on a location of the user 120 (e.g., the location of the user's face or ear), the system 100 provides instructions to the actuators 110 to change the direction of the speaker 105 in order to optimize the performance of the audio system 100. For example, optimal performance may be obtained if the speaker 105 faces the ear of the user 120. When the user 120 moves, the actuators 110 change the direction of the speaker 105 to continue to point at the location of the user's ear in 3D space.

Figure 2:
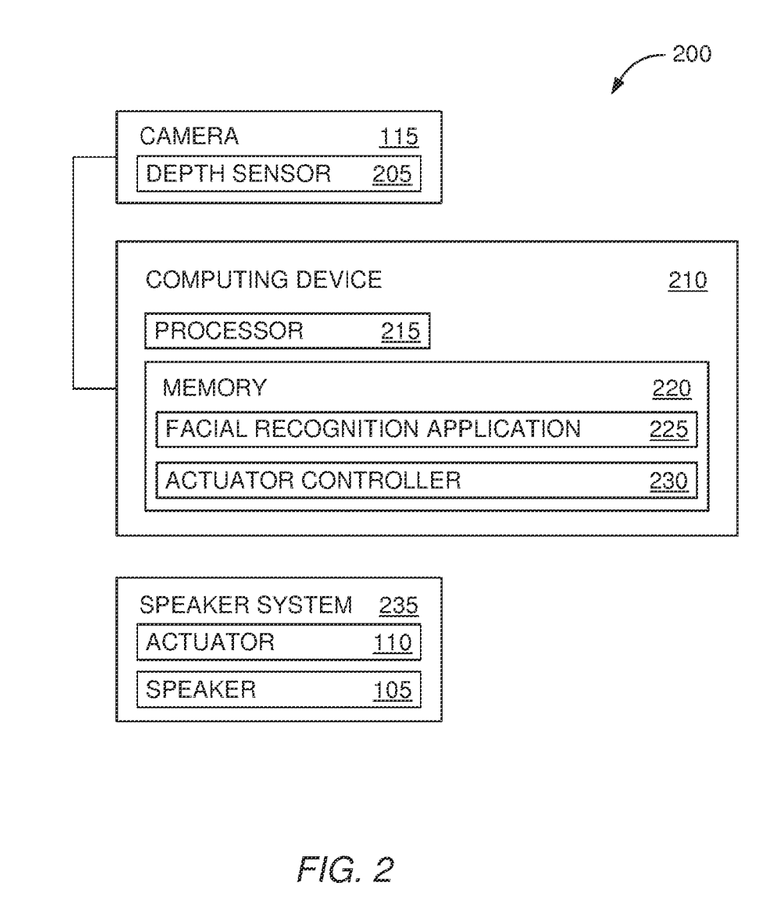
FIG. 2 is a block diagram of a system for adjusting the speaker based on facial recognition.

FIG. 2 is a block diagram of a system 200 for adjusting the speaker 105 based on facial recognition. System 200 includes camera 115, computing device 210, and speaker system 235. The camera 115 includes a depth sensor 205 for collecting depth information for determining the distance between the camera 115 and the user. However, as discussed above, in other examples the camera 115 may not collect depth information.

The camera 115 is coupled to computing device 210 which includes processor 215 and memory 220. The computing device 210 can be a general purpose computing device such as a laptop, tablet, server, desktop computer, etc. or a specialized computing device for performing the aspects and examples described herein. The processor 215 can be any processing element suitable for performing the functions described herein. Processor 215 may represent a single processing element or multiple processing elements that can each include one or more processing cores. Memory 220 may be volatile or non-volatile memory that can include hard disks, RAM, Flash memory, and the like. As shown here, memory 220 includes a facial recognition application 225 and actuator controller 230. The facial recognition application 225 receives the 2D or 3D data captured by the camera 115 and identifies a user in the area in front of the camera 115. The facial recognition application 225 may generate one or more coordinates that identify the location of the user (e.g., the location of the user's face) in 2D or 3D space. Using these coordinates, the actuator controller 230 determines corresponding control signals for the actuator 110 in order to move the speaker 105 to optimize the performance of the system 200. For example, if performance is improved if the speaker 105 faces an ear of the user, then the actuator controller 240 determines the control signals that cause the speaker 105 to face in the direction of the user's ear.

In one aspect, the actuator controller 230 may include a transformation function or algorithm for converting the coordinates provided by the facial recognition application 225 into control signals for the actuator 110. For example, the application 225 may return one or more x, y, and z coordinates that identify the location of the user in front of the camera 115. The transformation function may use the x, y, and z coordinates as inputs and output a corresponding control signal for the actuator 110 which results in the speaker 105 facing the user. The transformation function may be generated during a configuration stage where one or more points in free space are mapped to specific settings of the actuator 110. These mappings may then be generalized to form the transformation function that can map a set of coordinates in free space into corresponding settings of the actuator 110. However, this is only one non-limiting way of generating a transformation function for converting 2D or 3D coordinates into actuator signals that point the speaker 105 in the direction of the received coordinates.

In one aspect, the actuator controller 230 may use the coordinates provided by the facial recognition application 225 to identify different coordinates. For example, the facial recognition application 225 may return the coordinates of a nose of the user in 3D space. However, to point the speaker 105 at the user's ear, the actuator controller 230 may use a predefined adjustment parameter to estimate the likely location of the user's ear. This adjustment parameter may vary based on the distance of the user from the camera 115—e.g., the adjustment parameter may be larger when the user is closer to the camera 115. By altering the coordinates using the adjustment parameter, the actuator controller 230 can then generate coordinates corresponding to, for example, the user's ear which can be used as input into the transformation function to determine the actuator control signals.

In another example, the actuator controller 230 changes the coordinates provided by the facial recognition application 225 depending on how many users are detected. For example, if application 225 outputs coordinates for three different users, the actuator controller 230 may average the coordinates to identify a location between the users. In this manner, regardless of the number or location of the users in the system 200, the actuator controller 230 can be designed to alter the coordinate (or coordinates) provided by the facial recognition application 225 in order to adjust the speaker 105.

Speaker system 235 includes actuator 110 and speaker 105 which were described in FIG. 1. The speaker system 235 may include a unitary body that encapsulates both of these components, or a support structure for the components. In one example, the actuator 110 may be remote from the speaker 105 and speaker system 235 may include mechanical elements such as a cable, chain, or a pneumatic hose for transferring force from actuator 110 to speaker 105.

Figure 3:
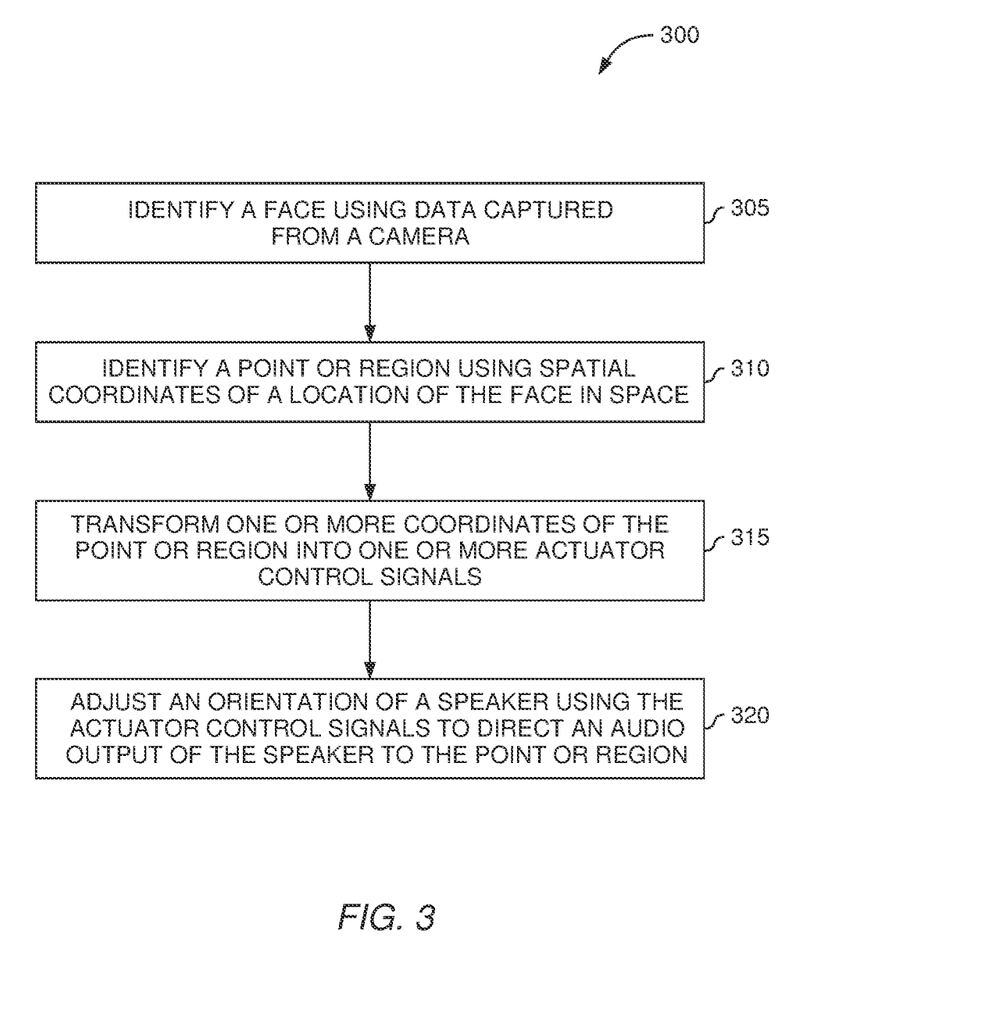
FIG. 3 is a method of adjusting the speaker based on facial recognition.
Figure 4A:
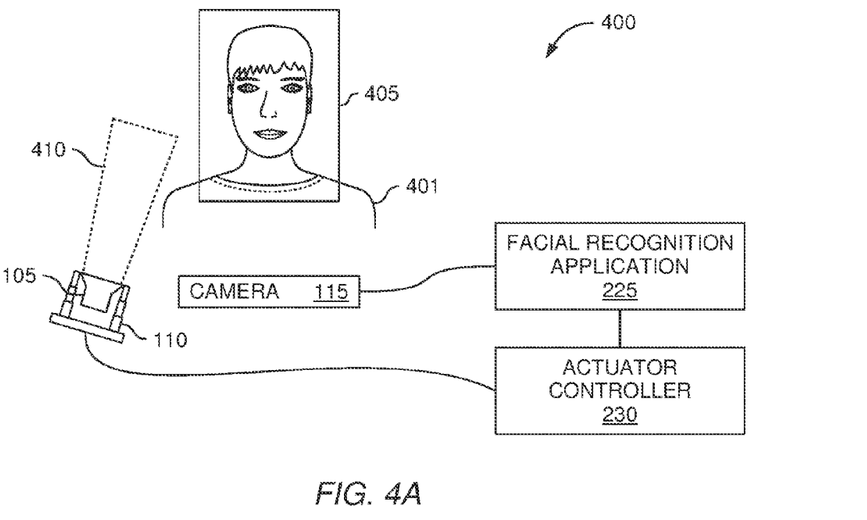
FIGS. 4A-4C illustrate identifying a location to direct the speaker based on facial recognition.

FIG. 3 is a method 300 of adjusting the speaker using facial recognition. To improve understanding, the blocks of method 300 are described in tandem with the system shown in FIGS. 4A-4C. At block 305, the facial recognition application 225 identifies a face using data captured from the camera 115. As shown in system 400 of FIG. 4A, the facial recognition application 225 identifies a bounding box 405 around user 401. The examples provided herein are not limited to a particular algorithm for identifying a user 401 based on data captured from a camera 115. In this example, application 225 identifies the bounding box 405 which is centered around the head of the user 401, but in other examples, the facial recognition application 225 may return a single coordinate that identifies the geometric middle of the user's face or a plurality of coordinates that each correspond to a different feature of user 401—e.g., an eye, ear, mouth, etc.

The facial recognition application 225 transmits the coordinates of the bounding box 405 to the actuator controller 230. At block 310 of method 300, the actuator controller 230 identifies a point or region using the coordinates of the bounding box 405. For example, when only one user 401 is identified by the facial recognition application 225, the actuator controller 230 may direct the speaker 105 to the ear of the user. In one example, the facial recognition application 225 may identify and provide the coordinates of the user's ear to the actuator controller 230. However, in the example shown in FIG. 4A, the actuator controller 230 calculates the location of the user's ear using the coordinates of the bounding box 405.

Figure 4B:
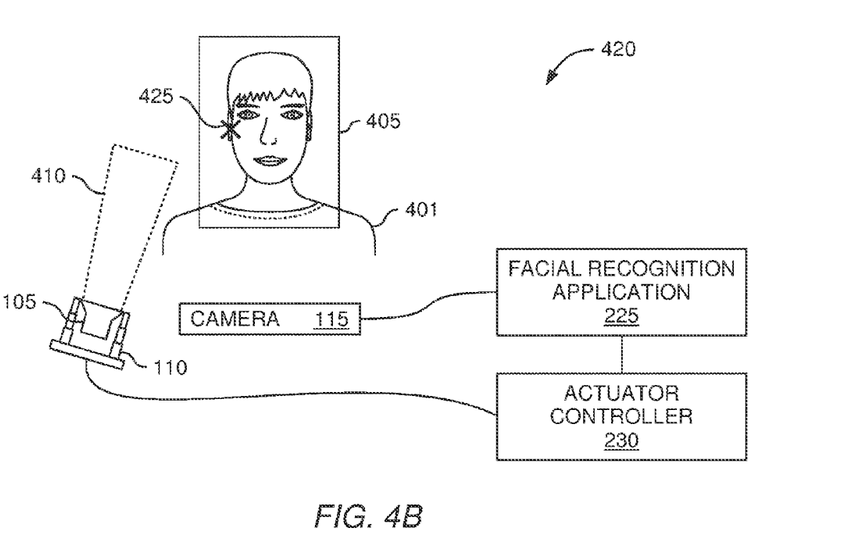

As shown in system 420 of FIG. 4B, the actuator controller 230 determines that a location 425 of the ear by using an adjustment parameter which may vary depending on the distance between the user 401 and the camera 115 or speaker 105. For example, the adjustment parameter may be a predefined value that is subtracted from the middle coordinate on the left side of the bounding box 405 which yields the coordinates for the location 425 of the ear. Of course, the type or value of the adjustment parameter may vary depending on the coordinates provided by the facial recognition application 225. That is, a different adjustment parameter is needed when the application 225 outputs coordinates for the user's nose compared to when the application 225 outputs the bounding box 405 as shown. Moreover, as mentioned above, the actuator controller 230 may change the coordinates differently when the facial recognition application 225 identifies multiple users. For example, instead of estimating a location of the user's ear 425, the actuator controller 230 may use the coordinates provided by the facial recognition application 225 to identify a region or point between multiple users.

At block 315, the actuator controller 230 transforms the point or region identified using the coordinates from application 225 into actuator control signals. The controller 230 may use a transformation function or algorithm that maps the point (i.e., the location 425 of the user's ear) into control signals that change the direction of the speaker 105 to face the point. The actuators 110 receive these signals and change the direction faced by the speaker 105. Region 410 illustrates an area in front of the speaker 105 where the audio output of the speaker is the loudest (e.g., includes 90% of the audio output from the speaker 105). As shown, the user 401 is outside of region 410, and as such, may experience a poorer audio presentation than if the user 401 was within region 410.

Figure 4C:
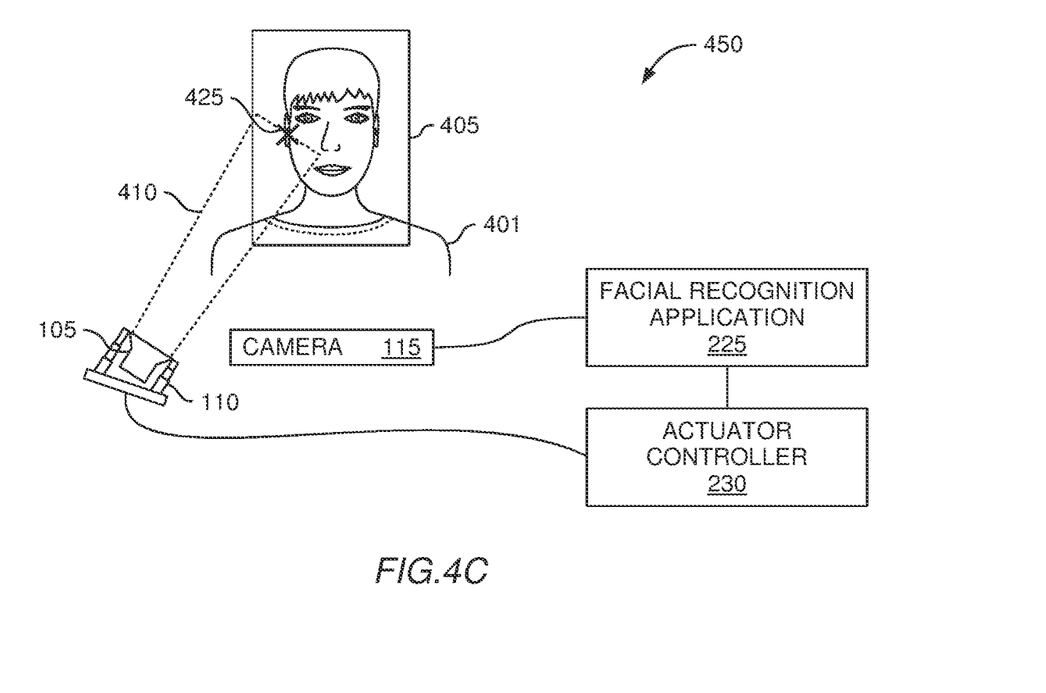

At block 320, in response to the control signals, the actuators 110 adjust the direction faced by the speaker 105 such that audio output defined by region 410 now includes the location of the user's ear 425 as shown in FIG. 4C. In one example, the direction of the speaker 105 is adjusted such that the location of the user's ear 425 is at least within the region 410. That is, instead of moving the speaker 105 until the direction the speaker 105 faces intersects with the location 425, the location 425 only needs to be within region 410. By not requiring precise alignment, the system 450 improves the experience of the user 401 and may be able to use a less expensive camera 115 or save processing time when executing the application 225 which may output less accurate coordinates. Nonetheless, these coordinate may be sufficiently accurate enough to derive control signals that ensure the location 425 is within region 410, even if the speaker 105 does not directly face the user's ear. Moreover, because the camera 115 is physically separate from the speaker 105, when the audio output region 410 is changed (i.e., the orientation of the speaker 105 is changed), the orientation of the camera 115 may remain fixed in its current orientation. Stated differently, the camera 115 continues to face the same direction while the audio output region 410 of the speaker 105 changes.

Figure 5A:
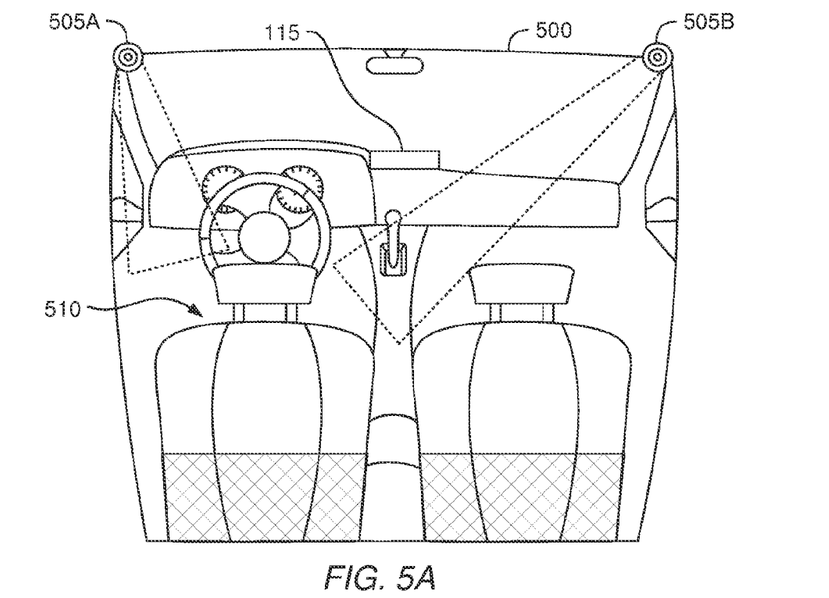
FIGS. 5A and 5B illustrate adjusting a speaker arrangement based on the number of occupants in a vehicle.
Figure 5B:
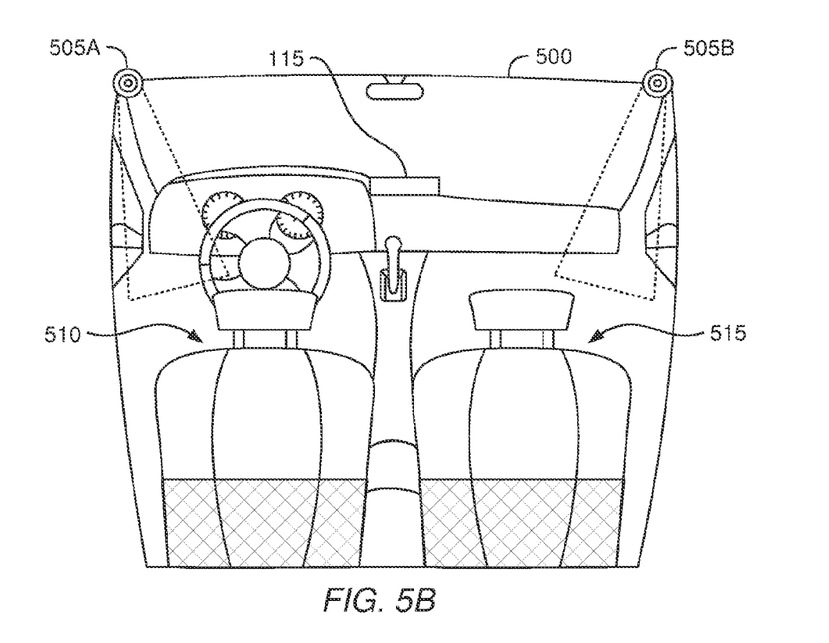

FIGS. 5A and 5B illustrate adjusting a speaker arrangement based on occupants in a vehicle 500. Specifically, FIGS. 5A and 5B illustrate the front half of the vehicle 500 while the backseat or rear speakers (if any) are omitted. As shown by the top views in FIGS. 5A and 5B, the vehicle 500 includes a camera 115 and two speakers 505 mounted on a dashboard or in pillars of the vehicle 500. For clarity, the actuators used to move the speakers 505 as well as the computing device used to process the data captured by the camera 115 and determine control signals for the actuators have been omitted. Nonetheless, in one example, the computing device may be integrated into an on-board computer used to operate the vehicle or an infotainment system integrated into the vehicle 500.

Based on the data captured by camera 115, a facial recognition application in the computing device determines how many passengers are in the vehicle 500 and where these passengers are located in 2D or 3D space. In FIG. 5A, the computing device determines that there is only one passenger in the vehicle 500 who is located at position 510 (i.e., the driver). In response, an actuator controller in the computing device identifies a point or region to direct the speakers 505.

In one aspect, the point or region may be the same for both speaker 505A and speaker 505B—e.g., both speakers are pointed at the same 3D point. Alternatively, the computing device may calculate a different point or region for the speakers 505. For example, speaker 505A may point to the driver's left ear while speaker 505B points to the driver's right ear. Doing so permits the audio system to output different sounds on the speakers 505 or use surround sound to provide a more immersive experience for the driver. However, if the sounds outputted for both speakers 505 are the same, a more optimal arrangement may be to direct both speakers 505 at a common point in front of the user. Because of the different distances between the driver and the two speakers, if speaker 505A is directed to the driver's left ear while speaker 505B is directed to the driver's right ear, the driver may hear different levels of sound, which may be unpleasant. Of course, in one example, the computing device may compensate for this difference in distance by increasing the audio output of speaker 505B (or decreasing the output of speaker 505A) when aiming each speaker at different ears. Regardless, by tracking the position 510 of the user, the audio system is able to adjust the speakers 505 to optimize the audio presentation.

In FIG. 5B, the computing device determines that there are two passengers in the vehicle 500—one at location 510 and another at location 515. To identify the passengers, the camera 115 is positioned such that driver's seat and the front right passenger seat are both within its view. The facial recognition application scans the image data generated by camera 115 to identify the locations of the passengers in the vehicle 500. Because there are two passengers in this example rather than only one passenger as shown in FIG. 5A, the audio system may adjust the speakers differently. For example, the computing device may adjust speaker 505A to face the driver, while speaker 505B is adjusted to face the passenger. In one embodiment, speaker 505A may face a central location of the driver's face such as her nose so that the audio output of speaker 505A is heard equally in the driver's ears. Similarly, speaker 505B may be adjusted to face a central location of the passenger's face at location 515 so that its output is heard equally in both her ears. However, another optimized solution may be to face speakers 505A and 505B directly at one of the ears of the driver or passenger. The particular solution used may vary depending on the user's preferences, type of speakers used, the particular acoustics of the vehicle 500, and the like.

FIGS. 5A and 5B illustrate that the computing device changes how the speakers are adjusted based on the number of passengers in a vehicle. Stated more generally, the particular technique for improving the performance of the audio system may change based how many users are within the view of the camera 115. For example, instead of a vehicle, the audio system may be a home entertainment system which uses different speaker arrangements depending on the number of users present in the room.

In addition to considering the location of a user and/or the number of identified users, the computing device may optimize the performance of the system according to specified user preferences. For example, in addition to recognizing a location of the face of a user, the facial recognition application may identify the name of the user based on her facial features. Once the user is identified, the computing device can lookup preferences associated with the user. For example, User A may prefer more bass and less treble than User B. Or User A may prefer stereo sound while User B prefers surround sound. The computing device can take these preferences into account when optimizing performance. For example, when User A is the driver, the computing device can change the bass to treble ratio for the speakers 505. In one aspect, the system may make other electrical changes to the audio outputted by the speakers 505 such as modifying how the audio signals are processed—e.g., changing the equalization, delay, etc.

While vehicle 500 is illustrated as a car, the embodiments described herein can apply to other types of vehicles such as boats, motorcycles, airplanes, and the like. Furthermore, the vehicle 500 may include any number of speakers or cameras for identifying and optimizing the performance of the audio system.

Figure 6A:
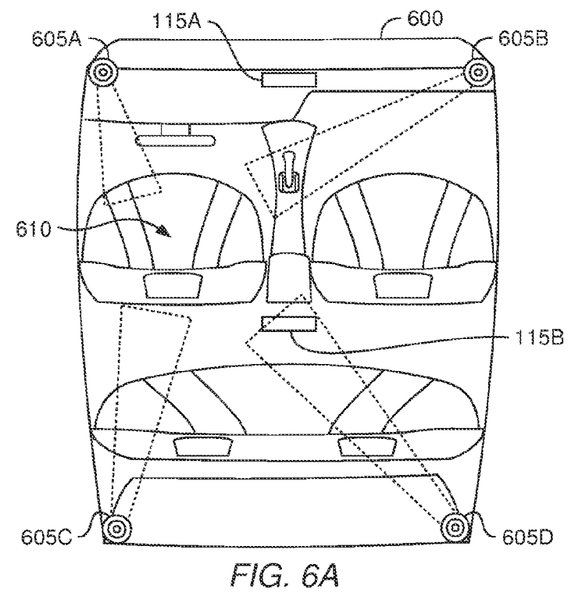
FIGS. 6A and 6B illustrate adjusting a speaker arrangement based on the number of occupants in a vehicle.
Figure 6B:
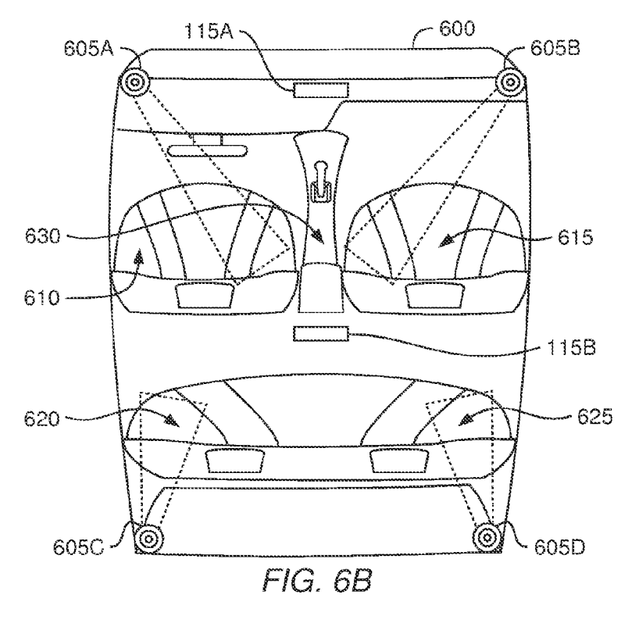

FIGS. 6A and 6B illustrate adjusting a speaker arrangement based on the number of occupants in a vehicle 600. As shown by the top view in FIGS. 6A and 6B, the vehicle 600 includes cameras 115A and 115B and four speakers 605. The speakers 605A and 605B are mounted in the front of the vehicle 600, while speakers 605C and 605D are mounted in the rear of the vehicle 600. For clarity, the actuators used to move the speakers 605 as well as the computing device used to process the data captured by the cameras 115 and determine control signals for the actuators have been omitted. In one embodiment, the computing device may be integrated into an on-board computer used to operate the vehicle or an infotainment system integrated into the vehicle 600.

Based on the data captured by cameras 115A and 115B, the facial recognition application in the computing device determines how many passengers are in the vehicle 600 and where these passengers are located in 2D or 3D space. To do so, camera 115A is located in the front of vehicle 600 while camera 115B is mounted in the rear of the vehicle 600. Two cameras may be desired since the view of the rear of the vehicle 600 relative to camera 115A may be occluded by the two front seats. However, in other embodiments, the vehicle 600 may use only one camera 115 in order to identify passengers in the front and rear of the vehicle 600.

In FIG. 6A, the computing device determines that there is only one passenger in the vehicle 600 who is located at position 610 (i.e., the driver's seat). That is, based on the image data provided by the rear camera 115B, the facial recognition application determines that there are no occupants in the rear seats of the vehicle 600, while the image data provided by the front camera 115A indicates that the driver is at location 610. In response, the computing device identifies a point or region to direct the speakers 605 to optimize the performance of the audio system. In one embodiment, the four speakers 605 all point to the same 3D point associated with location 610. For example, the computing device may calculate a central location relative to the user and generate respective actuator signals so the four speakers 605 are directed at this location. Alternatively, the right two speakers (speakers 605B and 605D) may face the driver's right ear, while the left two speakers (speakers 605A and 605C) face the driver's left ear. Or the computing device may arrange the speakers 605 in order to provide the driver with a surround sound experience, in which case, the speakers 605 may all be directed to different 3D points or regions.

As discussed above, the computing device may optimize the audio system by uniquely identifying the user using the facial recognition application. For example, the computing device can take account of user preferences such as whether the user prefers more bass or more treble using the facial recognition application and change these audio parameters match the user's preferences. In one example, the computing device includes an I/O interface where the user can enter preferences for the computing device to consider. Or the computing device may be coupled to an infotainment system in the vehicle 600 that shares the user's preferences with the computing device to change an audio or video parameter. Alternatively or additionally, the computing device may learn the user's preferences using historical information. For example, initially the computing device may direct all four of the speakers 605 at a central location when User A is the only passenger in the car. Using the I/O interface, User A may instead instruct the computing that she prefers surround sound when she is the only passenger. In this manner, the computing device can learn and adjust the audio/video parameters or other parameters (e.g., seat or steering wheel adjustments) for a particular user or groups of users.

In FIG. 6B, the computing device determines that there are multiple passengers in the vehicle 600 who are sitting at locations 610, 615, 620, and 625. For the rear passengers at locations 620 and 625, the computing device adjusts the right, rear speaker 605D to face location 625 and the left, rear speaker 605C to face location 620. Both speaker 605C and 605D may point at one of the ears of the passengers at these locations. In contrast, for the front passengers at locations 610 and 615, the computing device adjusts the right, front speaker 605B and the left, front speaker 605A to point at a location 630 between locations 610 and 615. To do so, the computing device may average the coordinates of the locations 610 and 615 to identify location 630. Thus, FIG. 6B illustrates that the optimal arrangement for the speakers 605 in the front half of the vehicle 600 may be different than the optimal arrangement of the speakers 605 in the rear half of the vehicle 600. Stated differently, to provide optimal performance for the users in the vehicle 600, the computing device may use different speaker arrangements depending on the different locations of the users in the vehicle 600. For example, the different locations may have different acoustic properties, and thus, even if the same user moves around to the different locations, the computing device may nonetheless use different speaker arrangements to provide improved performance. For instance, if User A is in the driver's seat, the computing device may adjust speaker 605A to point directly at the user's ear. However, if User A is in the rear of the vehicle, the computing device may instruct speaker 605C to point at a center location at the back of the user's head.

The different examples, embodiments, and aspect described herein discuss adjusting a speaker arrangement to optimize the audio experience of one or more users. The use of "optimal" is not intended to mean the speaker arrangement must be the best arrangement but rather that the optimal or optimized arrangement improves the experience of the user relative to a speaker arrangement where the speakers remain fixed. Stated differently, the examples described herein improve the listening experience by using actuators to change the direction faced by the speakers and adapt to the current location of the user or users.

Figure 7:
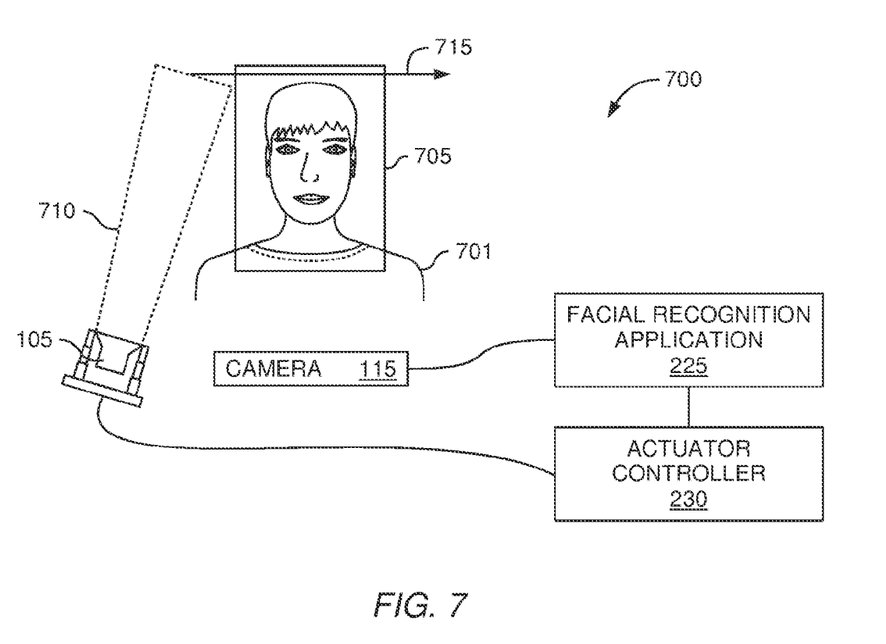
FIG. 7 is a system for identifying a path for adjusting a steerable speaker based on facial recognition.

FIG. 7 is a system 700 for identifying a path 715 for directing a steerable speaker 105 based on facial recognition. In some cases, it may be desirable to create a sound experience that mimics movement of objects along a path. To do so, the system 700 includes user 701, camera 115, facial recognition application 225, actuator controller 230, and speaker 105. The camera 115 captures image data that includes user 701 which is then transmitted to the facial recognition application 225. The application 225 uses a facial recognition algorithm to identify a bounding box 705 which defines a location of the user's face in 3D or 2D space. Of course, other facial recognition algorithms may identify the user's face using different means than bounding box 705.

The facial recognition application 225 transmits the coordinates of the bounding box 705 to the actuator controller 230. Instead of identifying a point or region to point the speaker 105 at using the coordinates, in this example, the actuator controller 230 determines the path 715. By instructing the audio output of the speaker 105 to follow the path 715, the speaker 105 may be used to mimic sounds emitted from sources that are moving (e.g., a bird or plane flying over the user 701 or a person running past the user 701). In one aspect, the actuator controller 230 may determine the path 715 in response to receiving a command from an audio system to mimic the sound emitted from a mobile source. For example, the actuator controller 230 may wait to determine path 715 until an audio controller (e.g., a movie or video game controller) sends an instruction to the actuator controller 230 to determine a path 715 for a particular sound. In one example, the audio controller and actuator controller 230 may be synchronized so that as the controller 230 moves the speaker 105 to track the path 715, the audio controller outputs the sound corresponding to the mobile source. For example, as the output region 710 of the speaker 105 moves along path 715, the speaker 105 outputs the sound of a bird chirping.

To determine path 715, the audio controller may inform the actuator controller 230 of the sound or the type of motion the audio output should simulate. While path 715 in FIG. 7 is linear, in other examples, the path 715 may have one or more curves, a loop, and the like. For example, the path 715 may mimic a bird circling around the head of the user 701 or a mosquito buzzing around the user's ear. Thus, depending on this information, the actuator controller 230 uses the coordinate of the bounding box 705 to identify path 715. In the example shown, the actuator controller 230 may use a first predefined offset to identify a first point in 3D space that is to the left of the upper leftmost corner of bounding box 705 and a second predefined offset to identify a second point in 3D space that is the right of the upper rightmost corner of bounding box 705. The actuator controller 230 then generates path 715 by drawing a line between the first and second points.

The actuator controller 230 may calculate the path 715 differently depending on the sound to be mimicked using speaker 105. For example, for a mosquito buzzing around an ear of the user 701, the actuator controller 230 may estimate the position of the ear using the coordinates of the bounding box 705 and, using a random number generator, determines a random path that is proximate to the user's ear. Alternatively, for a bird circling overhead, the actuator controller 230 may use a predefined vertical offset to identify a point above the head of the user 701. The actuator controller 230 then calculates a circle that is centered at the point above the user 701 to use as path 715. In this manner, the actuator controller 230 may be configured to use different techniques for calculating path 715 to mimic different mobile sources of sound.

The system 700 may be used with a audio/video presentation such as a movie, television show, video game, and the like. For example, system 700 may be installed in a theater to identify the location of one or more users and provide a customized audio experience to each user or a group of users. In one example, system 700 includes multiple speakers 105 (e.g., a speaker for each of the user's in the theater) that use respective actuators to move the respective output regions 710 of the speakers 105 along different, individual paths 715. Or multiple speakers 105 may be used to mimic different sound sources near the user 701. One speaker 105 may follow a path the mimics a bird flying over the user 701 while a different speaker 105 follows a path that mimics a projectile whistling past the user 701—e.g., a bullet or arrow. System 700 may also be used in an audio presentation where there is no corresponding video presentation. For example, the system 700 may be used in an animatronic/puppet show or during a stage performance with live actors to provide a more immersive environment for the user 701.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    receiving a location of a user based on image data captured by one or more cameras;
    identifying one or more coordinates in space based on the location of the user;
    determining an identity of the user based on the image data, wherein the identity is associated with a user preference; and
    based on the one or more coordinates and the user preference, generating a control signal using one or more computer processors that adjusts at least one actuator coupled to a speaker to change an orientation of the speaker in order to achieve a desired acoustic environment relative to the one or more coordinates, and wherein an orientation of the one or more cameras remains fixed in space while the orientation of the speaker is changed.

2. The method of claim 1, wherein the location of the user identifies a face of the user in one of two-dimensional or three-dimensional space, the method further comprises:
    identifying, using the identified face of the user, the user preference associated with the user; and
    changing a parameter of a vehicle in which the user is located based on the user preference.

3. The method of claim 1, wherein the location of the user comprises a depth measurement based on a distance from the user and the one or more cameras.

4. The method of claim 1, wherein generating the control signal further comprises:
    transforming the one or more coordinates into the control signal using a predefined function.

5. The method of claim 4, wherein the control signal is configured to adjust the speaker such that the speaker faces the one or more coordinates.

6. The method of claim 1, wherein the one or more coordinates define a path in three dimensional space, and wherein the control signal is configured to adjust the actuator such that the audio output of the region follows the path.

7. The method of claim 1, further comprising:
    receiving a plurality of locations corresponding to a plurality of users based on image data captured by the one or more cameras;
    generating a plurality of control signals for a plurality of actuators based on the plurality of locations, each of the actuators is configured to adjust a respective one of a plurality of speakers.

8. The method of claim 7, wherein the plurality of speakers are located in a vehicle, wherein the plurality of locations identifies a respective location of the plurality of users.

9. A system, comprising:
    a steerable speaker;
    an actuator mechanically coupled to the steerable speaker; and
    a computing device configured to:
        receive a location of a user based on image data captured by one or more cameras;
        identify one or more coordinates in space based on the location of the user;
        determine an identity of the user based on the image data, wherein the identity is associated with a user preference; and
        based on the one or more coordinates and the user preference, generate a control signal configured to adjust the actuator coupled to change an orientation of the steerable speaker in order to achieve a desired acoustic environment relative to the one or more coordinates, and wherein an orientation of the one or more cameras remains fixed in space while the orientation of the steerable speaker is changed.

10. The system of claim 9, wherein the location of the user identifies a face of the user in one of two-dimensional or three-dimensional space.

11. The system of claim 9, wherein the steerable speaker is mounted in a vehicle containing the user.

12. The system of claim 9, further comprising at least two actuators mechanically coupled to the steerable speaker, wherein the computing device is configured to determine respective control signals for the at least two actuators such that the audio output region of the steerable speaker includes the one or more coordinates.

13. The system of claim 12, wherein the respective control signals are configured to adjust the steerable speaker such that the movable speaker faces the one or more coordinates.

14. The system of claim 9, wherein the one or more coordinates of correspond to an estimated location of a body part of the user in space.

15. The system of claim 9, further comprising a plurality of actuators and a plurality of speakers, wherein the computing device is configured to:
    receive a plurality of locations corresponding to a plurality of users based on image data captured by the one or more cameras;
    generating a plurality of control signals for the plurality of actuators based on the plurality of locations, each of the actuators is configured to adjust a respective one of the plurality of speakers.

16. A non-transitory computer-readable medium storing instructions that, when executed by a processor, cause the processor to adjust a speaker by performing the steps of:
    receiving a location of a user based on image data captured by one or more cameras;
    identifying one or more coordinates in space based on the location of the user;

determining an identity of the user based on the image data, wherein the identity is associated with a user preference; and based on the one or more coordinates and the user preference, generating a control signal configured to adjust at least one actuator coupled to the speaker to change an orientation of the speaker in order to achieve a desired acoustic environment relative to the one or more coordinates, and wherein an orientation of the one or more cameras remains fixed in space while the orientation of the speaker is changed.

17. The non-transitory computer-readable medium of claim 16, wherein the location of the user identifies a face of the user in one of two-dimensional or three-dimensional space.

18. The non-transitory computer-readable medium of claim 16, wherein the location of the user comprises a depth measurement based on a distance from the user and the one or more cameras.

19. The non-transitory computer-readable medium of claim 18, wherein generating the control signal further comprises:

transforming the one or more coordinates into the control signal using a predefined function, wherein the depth measurement is at least one input into the predefined function.

20. The non-transitory computer-readable medium of claim 16, wherein the control signal is configured to adjust the speaker such that the speaker faces the one or more coordinates.

* * * * *